United States Patent
Schat (10) Patent No.: US 11,329,834 B2
(45) Date of Patent: May 10, 2022

(54) SYSTEM AND METHOD FOR GENERATING AND AUTHENTICATING A PHYSICALLY UNCLONABLE FUNCTION

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 16/787,566

(22) Filed: Feb. 11, 2020

(65) Prior Publication Data

US 2021/0250188 A1 Aug. 12, 2021

(51) Int. Cl.
*H04L 9/32* (2006.01)
*H03K 19/003* (2006.01)

(52) U.S. Cl.
CPC ..... *H04L 9/3278* (2013.01); *H03K 19/00384* (2013.01); *H04L 2209/12* (2013.01); *H04L 2209/38* (2013.01)

(58) Field of Classification Search
CPC .............. H04L 9/3271; H04L 9/3278; H04L 2209/12; G06F 21/73
See application file for complete search history.

(56) References Cited

U.S. PATENT DOCUMENTS 9,729,324 B2 8/2017 Yamamoto et al.
2013/0202107 A1* 8/2013 Danger ............ G01R 31/31719
380/44
2014/0185795 A1* 7/2014 Gotze ................... H04L 9/0866
380/44
2014/0201851 A1* 7/2014 Guo ......................... G06F 1/26
726/34
2016/0072632 A1* 3/2016 Blanton ................ H04L 9/3278
713/189
2019/0028283 A1* 1/2019 Sharifi .................... G06F 21/86

OTHER PUBLICATIONS

Feldhofer, M, et al. "A Case Against Currently Used Hash Functions in RFID Protocols", R. Meersman, Z. Tari, & P. Herrero (Eds.), On the Move to Meaningful Internet Systems 2006 (vol. 4277, pp. 372-381). https://doi.org/10.1007/11915034_61.
Helfmeier, C. "Cloning Physically Unclonable Functions", 2013 IEEE International Symposium on Hardware-Oriented Security and Trust (HOST), pp. 1-6. (Aug. 16, 2013).
Kim, D., et al. "Scan-PUF: PUF Elements Selection Methods for Viable IC Identification", 2015 IEEE 24th Asian Test Symposium, p. 121-126. (Mar. 3, 2016).

(Continued)

*Primary Examiner* — Ellen Tran (57) ABSTRACT

A method for controlling access to a chip includes obtaining first values of a first physically unclonable function of the chip, obtaining second values that correspond to at least one challenge word, performing a simulation based on the first values and the second values, and generating an authentication result for the chip based on results of the simulation. The simulation may generate responses to logical operations corresponding to combinatorial logic in the chip, and the logical operations may be performed based on a predetermined sequence of the first values and the second values. The chip may be authenticated based on a match between the responses generated by the simulation and a second physically unclonable function of the chip.

19 Claims, 9 Drawing Sheets

(56) References Cited

OTHER PUBLICATIONS

Liu, R., et al. "Extending 1kb RRAM Array from Weak PUF to Strong PUF by Employment of SHA Module", 2017 Asian Hardware Oriented Security and Trust Symposium (AsianHOST), pp. 67-72. (May 7, 2018).

Maes, R. "Experimental Evaluation of Physically Unclonable Functions in 65 nm CMOS", 2012 Proceedings of the ESSCIRC, 4 pages. (Nov. 12, 2012).

Maes, R., et al. "Intrinsic PUFs from Flip-flops on Reconfigurable Devices", Workshop on Information and System Security (WISSec). 17 pages. (2008).

Niewenhuis, B., et al. "SCAN-PUF: A Low Overhead Physically Unclonable Function from Scan Chain", 2013 IEEE International Test Conference (ITC), pp. 1-8. ( Nov. 4, 2013).

Wang, W., et al. "A Low-overhead PUF based on Parallel Scan Design", 2018 23rd Asia and South Pacific Design Automation Conference (ASP-DAC), pp. 715-720. (Feb. 22, 2018).

Yu, M., et al. "A Lockdown Technique to Prevent Machine Learning on PUFs for Lightweight Authentication", IEEE Transactions on Multi-Scale Computing Systems, vol. 2, No. 3, pp. 146-159. (Jul.-Sep. 2016).

Zang, H., et al. "Evaluation on Flip-flop Physical Unclonable Functions in a 14/16-nm Bulk FinFET Technology", 2018 IEEE International Reliability Physics Symposium (IRPS), 5 pages. (May 3, 2018).

Delvaux, Jeroen et al., "Secure Lightweight Entity Authentication with Strong PUFs: Mission Impossible?"; ICIAP International Conference on Image Analysis and Processing, 17th International Conference, Naples, Italy; Sep. 9-13, 2013.

Maes, Roel et al.; "Physically Unclonable Functions: a Study on the State of the Art and Future Research Directions";; Towards Hardware-Intrinsic Security; Jan. 1, 2010; pp. 3-37; DOI:10.1007/978-3-642-14452-3_1.

Zheng, Yu et al.; "ScanPUF: Robust Ultralow-Overhead PUF Using Scan Chain"; 2013 18th Asia and South Pacific Design Automation Conference (ASP-DAC); Jan. 22-25, 2013, Yokohama, Japan; DOI: 10.1109/ASPDAC.2013.6509668.

* cited by examiner

| PU_A1 | PU_A2 | PU_A3 | PU_A4 | PU_A5 | PU_A6 | PU_A7 | PU_A8 | PU_A9 |
|---|---|---|---|---|---|---|---|---|
| PU_B1 | PU_B2 | PU_B3 | PU_B4 | PU_B5 | PU_B6 | PU_B7 | PU_B8 | PU_B9 |
| PU_C1 | PU_C2 | PU_C3 | PU_C4 | PU_C5 | PU_C6 | PU_C7 | PU_C8 | PU_C9 |

FIG. 5A

| CH_A1 | CH_A2 | CH_A3 | CH_A4 | CH_A1 | PU_A2 | PU_A3 | PU_A4 | PU_A5 |
|---|---|---|---|---|---|---|---|---|
| CH_B1 | CH_B2 | CH_B3 | CH_B4 | CH_B1 | PU_B2 | PU_B3 | PU_B4 | PU_B5 |
| CH_C1 | CH_C2 | CH_C3 | CH_C4 | CH_C1 | PU_C2 | PU_C3 | PU_C4 | PU_C5 |

FIG. 5B

| RE_A1 | RE_A2 | RE_A3 | RE_A4 | RE_A5 | RE_A6 | RE_A7 | RE_A8 | RE_A9 |
|---|---|---|---|---|---|---|---|---|
| RE_B1 | RE_B2 | RE_B3 | RE_B4 | RE_B5 | RE_B6 | RE_B7 | RE_B8 | RE_B9 |
| RE_C1 | RE_C2 | RE_C3 | RE_C4 | RE_C5 | RE_C6 | RE_C7 | RE_C8 | RE_C9 |

SYSTEM AND METHOD FOR GENERATING AND AUTHENTICATING A PHYSICALLY UNCLONABLE FUNCTION

Example embodiments disclosed herein relate generally to security protection measures for semiconductor devices.

BACKGROUND

A physically unclonable function (PUF) is a digital fingerprint that may be used to identify a semiconductor device. The fingerprint is generated based on physical and/or electrical characteristics of the device, which, for example, may be based on variations in feature dimensions and/or doping concentrations that occur during the manufacturing process. Because the variations are uncontrollable (even by the fabricator), the resulting characteristics may be detected in order to form a digital fingerprint that uniqely identifies the device. In this way, the device fingerprints may be considered to be unclonable.

Because they are unclonable, PUFs are used as hardware security primitives that have proven to be beneficial in at least two respects. First, PUFs may only be created when needed and hence are not stored. Second, PUFs are more difficult to attack than other types of security measures such as one-time passwords (OTPs).

Examples of PUFs include strong PUFs and weak PUFs. Strong PUFs may react to challenge words and may provide an order of $2^n$ different challenge-response pairs, with n being the number of PUF circuit elements. Weak PUFs may only provide an order of n responses and may not operate on the basis of challenge words. While the use of PUFs have been beneficial, they have drawbacks which limits their effectiveness as a viable security solution.

SUMMARY

In accordance with one or more embodiments, a data processing method includes shifting power-up values of flip-flops through scan chain logic of a chip, controlling reading of the power-up values by combinatorial logic in the chip as the power-up values are shifted through the scan chain logic, and obtaining responses from the combinatorial logic based on the power-up values, wherein the power-up values correspond to a first physically unclonable function of the chip and the responses correspond to a second physically unclonable function of the chip generated based on the power-up values corresponding to the first physically unclonable function. The method may also include enabling the scan chain logic in accordance with operations that include concatenating the flip-flops into one or more scan chains. The power-up values of the flip-flops may be generated based on physical and/or electrical characteristics of the chip produced from a manufacturing process. The method may include shifting the responses corresponding to the second physical unclonable function into the flip-flops of the scan chain logic.

In accordance with one or more embodiments, a data processing method includes shifting a challenge word through flip-flops of scan chain logic in a chip, controlling reading of power-up values by combinatorial logic as the power-up values are shifted through the flip-flops of the scan chain logic, the power-up values shifted through the scan chain logic as the challenge word is shifted into the scan chain logic, and obtaining responses output from the combinatorial logic based on the power-up values and the challenge word, wherein the power-up values correspond to a first physically unclonable function of the chip and the responses correspond to a second physically unclonable function of the chip generated based on the challenge word and the power-up values corresponding to the first physically unclonable function.

The power-up values of the flip-flops may be generated based on physical and/or electrical characteristics of the chip produced from a manufacturing process. The method may include generating one or more signals to concatenate the flip-flops into one or more scan chains of the scan chain logic. The flip-flops may be located in different logical blocks of the chip. The responses corresponding to one or more logical operations performed by the combinatorial logic may be based on the power-up values and values of the challenge word.

In accordance with one or more embodiments, a data processing method includes obtaining first values of a first physically unclonable function of a chip, obtaining second values that correspond to at least one challenge word, performing a simulation based on the first values and the second values, and generating an authentication result for the chip based on results of the simulation, wherein the simulation generates responses to logical operations corresponding to combinatorial logic in the chip, the logical operations performed based on the first values and the second values, and wherein generating the authentication result includes authenticating the chip based on a match between the responses generated by the simulation and a second physically unclonable function of the chip.

The first values may correspond to power-up values of flip-flops in scan chain logic in the chip. The power-up values of the flip-flops may be generated based on physical and/or electrical characteristics of the chip produced from a manufacturing process. The flip-flops may be concatenated into one or more scan chains of the scan chain logic during at least one mode of operation of the chip. The second physically unclonable function may be received from the chip, and the simulation may be performed in a device in communication with the chip.

The second physically unclonable function may include values generated based on actual responses generated by the combinatorial logic on the chip and wherein the actual responses are generated by the combinatorial logic based on the first values and the second values. The actual responses may be generated based on the combinatorial logic performing one or more logical operations on the first value and then performing the one or more logical operations on the second values. The simulation may be performed by a server, and the chip may be included in a client of the server. The method may include receiving a request for a transaction or information and authorizing the request based on the authentication result.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Figure 1:
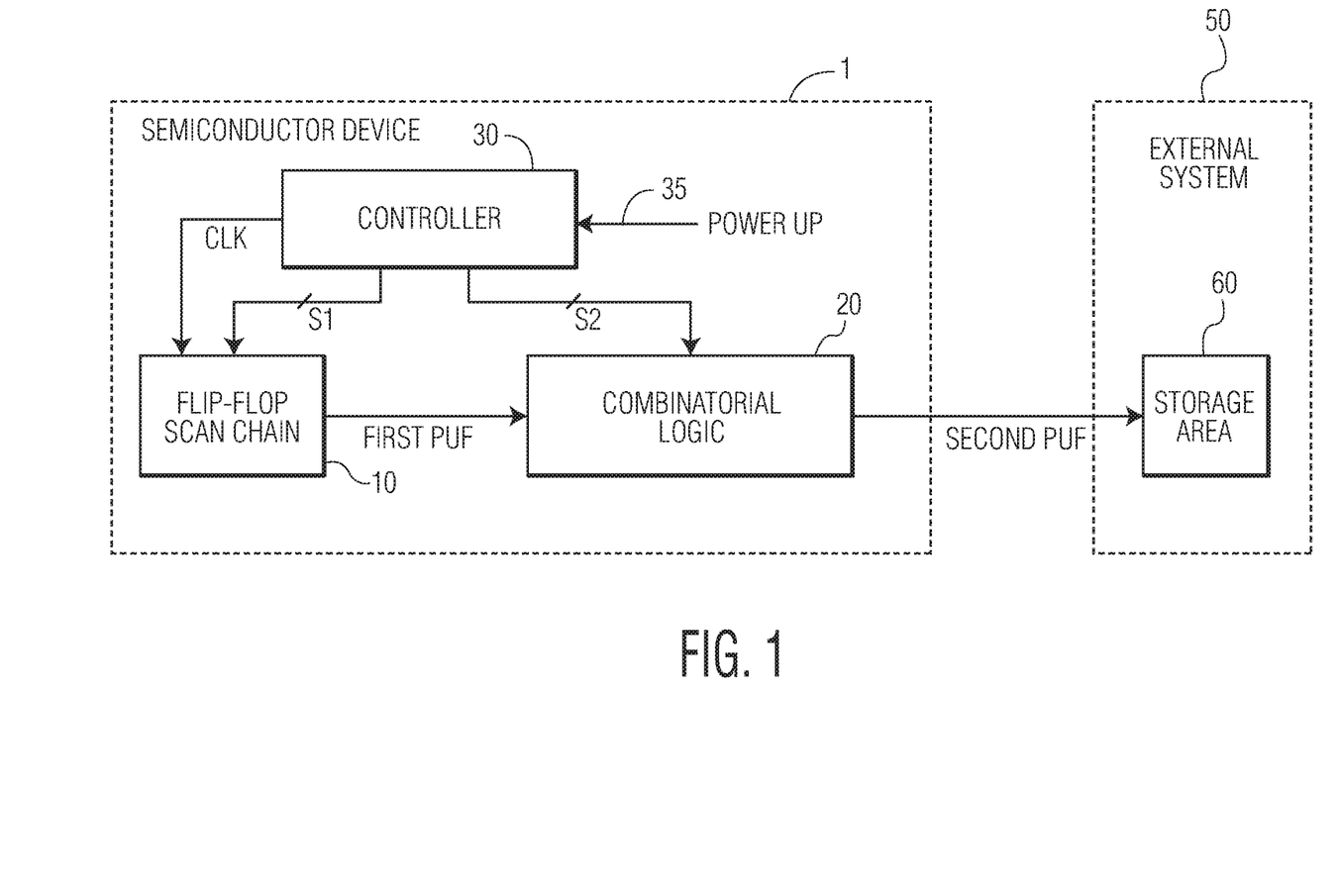
FIG. 1 illustrates an embodiment of a system for generating a security feature.

FIG. 1 illustrates an embodiment of a system for generating at least a second physically unclonable function based on a first physically unclonable function of a semiconductor device. The semiconductor device may be, for example, to one or more integrated circuit chips implemented in a product, such as, but not limited to, a smartcard (e.g., credit card), an identification card, an Internet of Things (IoT) device, or another product with information to be protected.

The first physically unclonable function is based on variations in the physical and/or electrical properties of one or more circuits of the semiconductor device. The second physically unclonable function is generated based on the first physically unclonable function. Through this multi-tiered approach, second and/or subsequent physically unclonable functions are generated for the semiconductor device that may exhibit improved resistance to tampering or hacking.

The second or subsequent physically unclonable functions may be strong PUFs that correlate to a plurality of flip-flops in the semiconductor device. For example, variations in physical and/or electrical characteristics may cause initial values to be stored in the flip-flops of the semiconductor device at power up. These values are reproducible and in fact are initially stored in the flip-flops each time a power-up occurs as a result of the variations, e.g., one flip-flop may initially store a logical one, another a logical zero, another a logical one, and so on. The initial power-up values are stored in the flip-flop before a reset operation is performed and may correspond to the first physically unclonable function, which is used as a basis in subsequent operations to generate the second physically unclonable function.

In an initial stage, a product which includes the semiconductor device may be subject to an enrollment procedure. Enrollment may involve a series of operations that generate the second, strong PUF from the first PUF. Information corresponding to the strong PUF may then be stored in a storage area accessible during an intended application of the device. While flip-flops figure prominently in generating the strong PUF in this embodiment, they may also have a dual use. For example, the flip-flops may not only be used to generate the second PUF during enrollment, they may also be used to support one or more functions during normal operation of the device. Thus, in accordance with at least one embodiment, specialized flip-flops used for identification and authentication of the device may not be required. In another embodiment, the device may use flip-flops that are specialized for enrollment and authentication.

Referring to FIG. 1, the system of this embodiment includes a flip-flop scan chain 10, combinatorial logic 20, and a controller 30 in a semiconductor device 1. These elements perform operations corresponding to an embodiment of a method illustrated in FIG. 2 for generating at least a second physically unclonable function based on a first physically unclonable function of the semiconductor device. The system elements and operations are discussed below.

Figure 2:
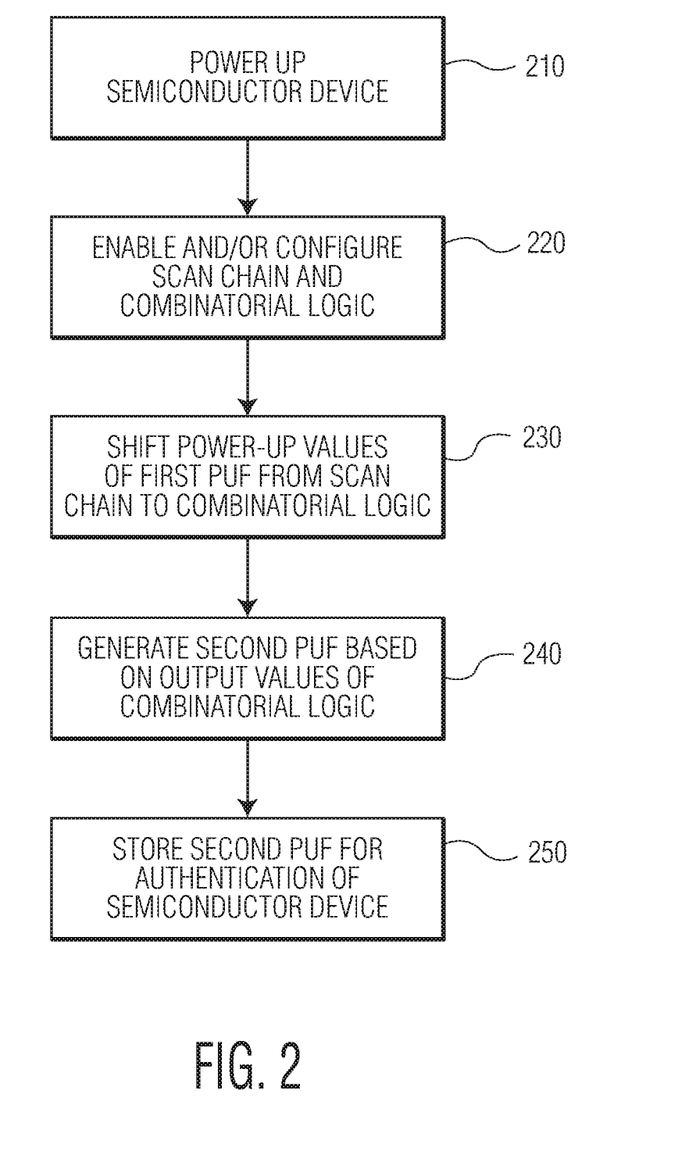
FIG. 2 illustrates an embodiment of a method for generating a security feature.

The flip-flop scan chain 10 includes a plurality of flip-flops that are sequentially linked together, at least logically if not physically, to form one or more scan chains at power up (operation 210). In one embodiment, the flip-flops are all included in a same logic circuit or block of the semiconductor device and already connected in series. In another embodiment, flip-flops from different logic circuits or blocks of the semiconductor device may be linked together using connection logic (e.g., switches, multiplexers, etc.) to form one or more scan chains coupled to the combinatorial logic. The scan chain(s) may be enabled and appropriately connected in sequence based on one or more control signals S1 output from the controller (operation 220).

The combinatorial logic 20 includes a plurality of logic gates coupled in a predetermined configuration. The logic gates may be used during normal operation to perform various functions of the intended application of the semiconductor device and are also used in a specialized sense to generate the second PUF in the manner described herein. In one embodiment, the logic gates may only be used for PUF generation during enrollment and authentication modes of operation, details of which are described in greater detail below. The combinational logic 20 may be enabled and appropriately connected based on one or more control signals S2 output from the controller 30 (operation 220).

The controller 30 may generate the control signals S1 and S2 in response to a power up signal 35 of the semiconductor device. The controller may generate these control signals to implement generation of the second PUF before initiating a reset operation of the flip-flops in the scan chain, so that the power-up values corresponding to the first PUF may be used as a basis for generating the values of the second PUF in accordance with various embodiments described herein. As previously described, the initial power-up (PU) values in the scan chain flip-flops are generated as a result of variations in the physical and/or electrical characteristics of the semiconductor device that result during fabrication. The controller 30 then outputs clock signals CLK to the flip-flop scan chain to shift the power-up values of the first PUF, on a bit-by-bit basis to the combinatorial logic 20 (operation 230). When all of the power-up values have been shifted out of the scan chain and processed through the combinatorial logic, the resulting bit values correspond to the second PUF (operation 240) in accordance with this embodiment.

Because the initial power-up values of the flip-flops in the one or more scan chains are unique to each semiconductor device (and unclonable) and because the specific configuration of combinatorial logic is known only to the manufacturer, the second PUF is generated as a combination of integrated security measures that makes unauthorized access, cloning, hacking, or other forms of theft or corruption virtually impossible.

Once the second PUF has been generated, it may be output from the semiconductor device to an external system 50 for storage in a storage area 60 (operation 250). The external system may be one or more of a server, cloud-computing network entity, workstation, or another system or device that is compatible with the intended application of the semiconductor device. For example, in a financial application the external system 50 may be a server for processing credit card or account information and the storage area 60 may be a database, memory, or other form of remote or local storage accessible by the server for authenticating and processing a purchase or transaction based on the credit card or account.

The foregoing operations may be considered to correspond to an enrollment mode of operation of the semiconductor device. Once the second PUF has been generated and enrolled, the product containing the semiconductor device may be used for its intended application, during which time an authentication procedure may be performed as a prerequisite to authorizing completion of the intended application.

Figure 3:
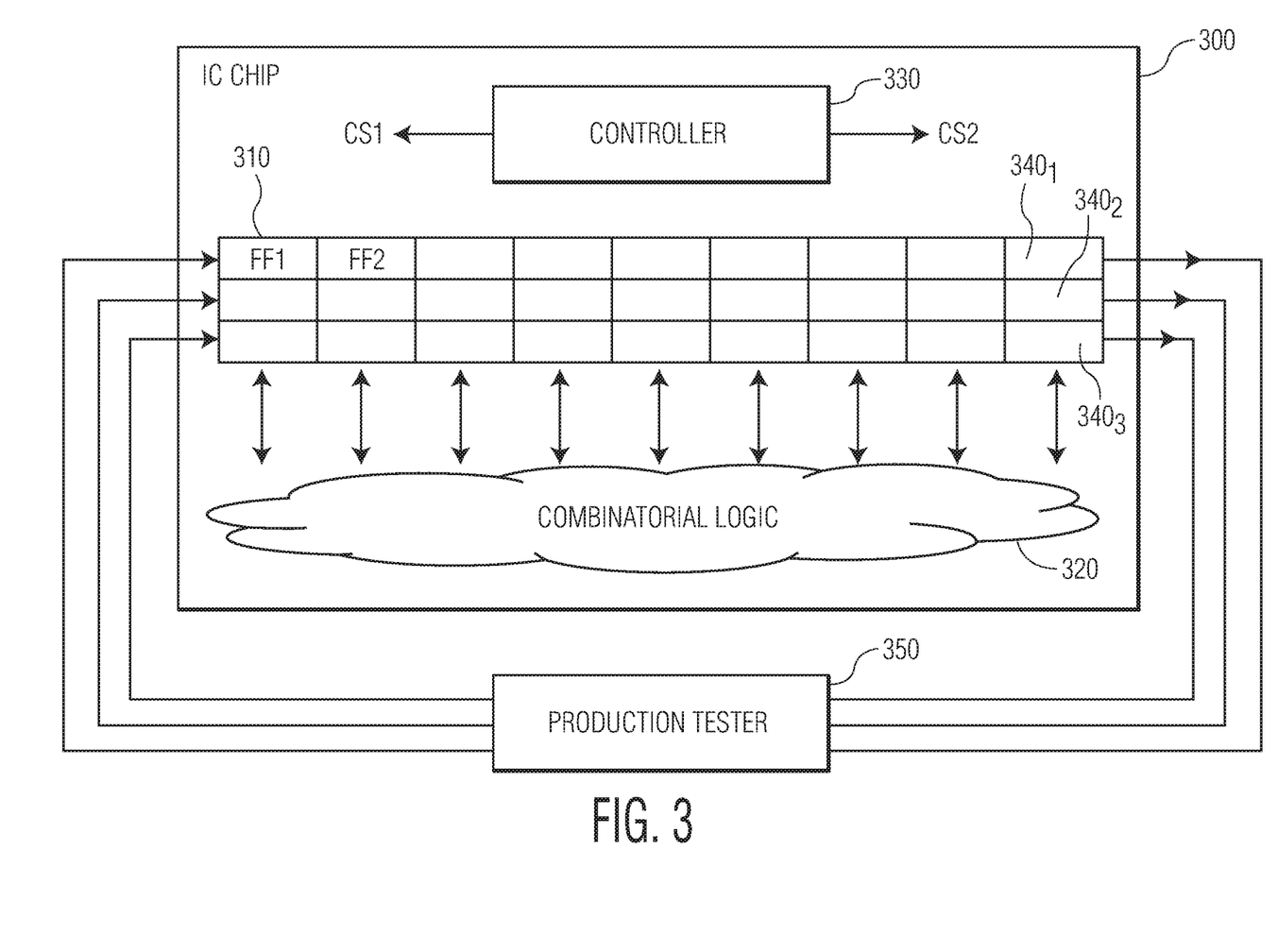
FIG. 3 illustrates another embodiment of a system for generating a security feature.

FIG. 3 illustrates another embodiment of a system for generating at least a second physically unclonable function based on a first physically unclonable function of a semiconductor device. In this embodiment, the second physically unclonable function may be generated based on power-up values of the flip-flops in one or more scan chains, combinatorial logic, and a challenge word.

Referring to FIG. 3, the system includes scan chain logic 310, combinatorial logic 320, and a controller 330 of a semiconductor device (integrated circuit (IC) chip) 300. The scan chain logic 310 may be a scan-testable digital logic circuit including a plurality of flip-flops 315 that form a plurality of scan chains that are concatented in a predetermined order. Each of the scan chains $340_1$ to $340_3$ may be considered to correspond to a respective row of the scan chain logic, with the boxes in each scan chain denoting individual flip-flops (e.g., FF1, FF2, etc.). The inputs of the scan chains are coupled (e.g., directly or indirectly connected) to respective input pins of the IC, and the input pins may be coupled to a production tester 350 that feeds data into the scan chains. The number of scan chains and the numbers of flip-flops in each scan chain may vary among embodiments. The outputs of the scan chains are coupled to respective output pins of the IC, and the output pins may also be coupled to the production tester for purposes capturing the output data.

The combinatorial logic 320 is illustrated to be separate from the scan chain logic. For example, each scan chain in the scan chain logic 310 may be coupled to the combinatorial logic. In another embodiment, the combinatorial logic may include one or more logic gates integrated or interspersed among the flip-flops in one or more of the scan chains. In one embodiment, one or more logic gates may be coupled to some of the logic gates in one of more of the scan chain and/or between respective pairs of flip-flops in one or more of the scan chains. Examples of the logic gates include, but are not limited to, AND, OR, NAND, NOR, XOR, or other combinations of logic gates.

The scan chain logic may operate in multiple modes. A first mode of operation is referred to as shift mode, in which data (e.g., bit values) are shifted through the flip-flops in the scan chains. A second mode of operation is referred to challenge mode, in which data (e.g., bit values) of one or more challenge words is shifted into the flip-flops of each scan chain, on a bit-by-bit basis, replacing the power-up values that have been shifted out of the scan logic. A third mode of operation is referred to as capture mode, in which the data from respective ones of the scan chains are captured or read, bit-by-bit, by the combinatorial logic, and the results (e.g., bit values) from the combinatorial logic (e.g., responses) are captured, for example, by inputting the data from the combinatorial logic back into the flip-flops or another storage location, once again on a bit-by-bit basis.

Two or more of the scan, challenge, and capture modes may be performed simultaneously, for at least a time, based on control signals CS1 and CS2 from an on-chip controller 350. For example, one or more control signal CS1 may enable the flip-flops in the scan chains and one or more control signals CS2 may enable the combinatorial logic. Clock signals may then be used to shift the bit values through the scan chains and combinatorial logic.

Figure 4:
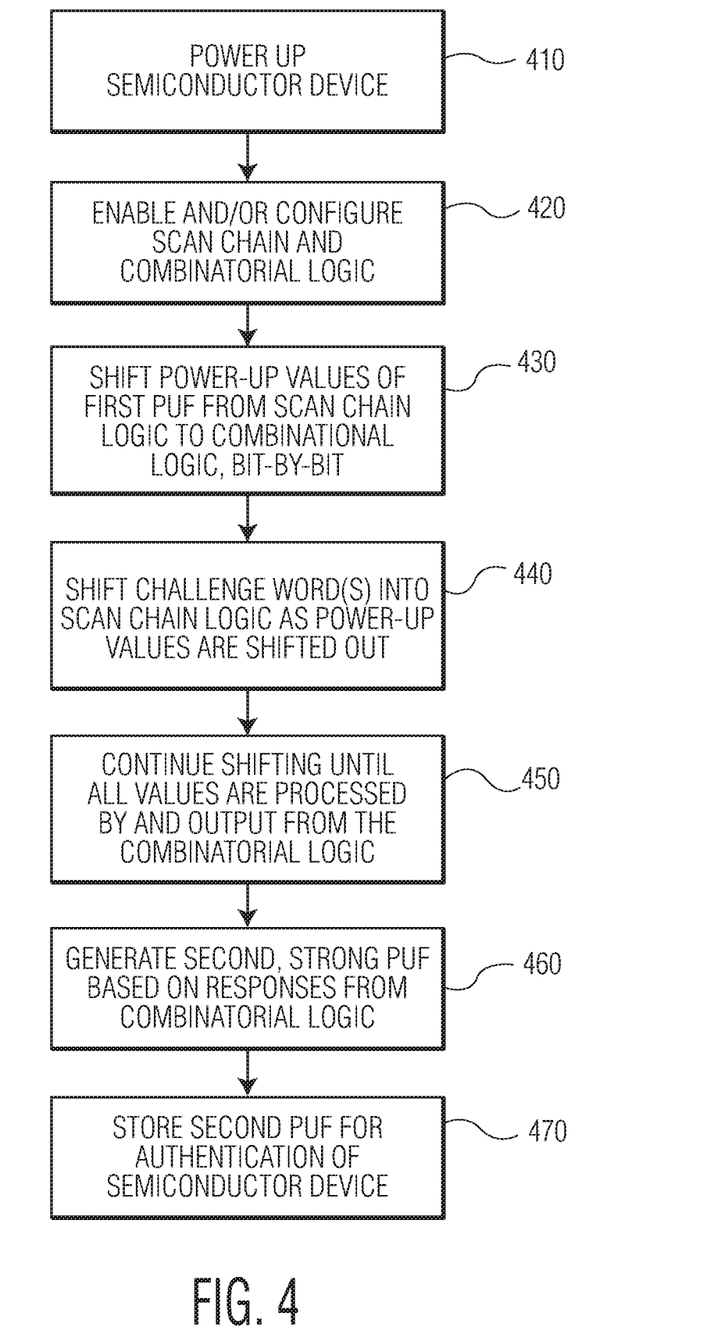
FIG. 4 illustrates another embodiment of a method for generating a security feature.

FIG. 4 illustrates an embodiment of a method for generating at least a second physically unclonable function based on a first physically unclonable function of a semiconductor device. This method may be performed, for example, based on the system of FIG. 3 or another system. For illustrative purposes, operations of the method embodiment of FIG. 4 will be described as being at least partially performed by the system of FIG. 3.

The method includes, at 410, powering up the semiconductor device corresponding to the integrated circuit chip and, at 420, generating control signals from the controller 330 to enable the scan chain logic 310 and/or the combinatorial logic 320. The power-up is performed before a reset operation is performed for the flip-flops. For example, the controller may suspend performance of the reset operation, at least for a time period required to generate the second or subsequent PUFs. During normal operation, reset of the flip-flops may also be performed until an authentication procedure is completed, as described in greater detail below. Once powered up, initial values are stored in the flip-flops of the scan chains as a result of variations in the physical and/or electrical characteristics of the chip. These initial (or power-up) flip-flop values may be considered to correspond to the first PUF of the integrated circuit.

Figure 5A:
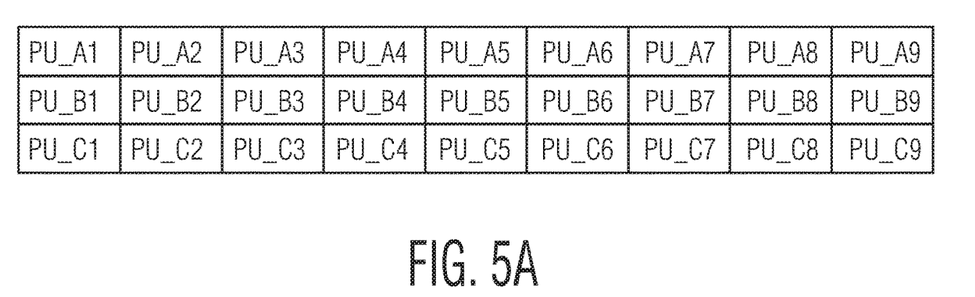
FIGS. 5A to 5C illustrate examples of different states of scan chain logic in generating a security feature.

FIG. 5A illustrates an example of the power-up (PU) values that correspond to the first PUF of the integrated circuit. In this example, PU_A1, PU_A2, . . . , PU_A9 correspond to the initial power-up values in respective flip-flops of the first scan chain, PU_B1, PU_B2, . . . , PU_B9 correspond to initial power-up values in respective flip-flops of the second scan chain, and PU_C1, PU_C2, . . . , PUC9 correspond to initial power-up values in respective flip-flops of the third scan chain. While multiple scan chains are shown, the scan chain logic may include only one scan chain in another embodiment. In an optional operation, the controller 330 may shift the initial values of the scan chain flip-flops to an external system (e.g., production tester, server, etc.) for storage, in order to provide an external record of the first PUF for the integrated circuit.

At operation 430, the scan chain logic 310 enters into shift mode based on control signals from the controller 330. The control signals may include clock signals with a predetermined period which shift the power-up values through the scan chain, one bit at a time, on each rising or falling edge of a clock pulse.

At operation 440, for each shift in the scan chain logic, the last flip-flop in each scan chain outputs either its power-up value or a power-up value received from a preceding one of the flip-flops into the combinatorial logic and the first flip-flop in each chain receives a bit from a challenge word of a predetermined number of bits. Thus, the integrated circuit chip may be said to be operating in challenge mode. The challenge word input into each scan chain is used as a basis for generating the second PUF of the integrated circuit, along with the power-up values.

Figure 5B:
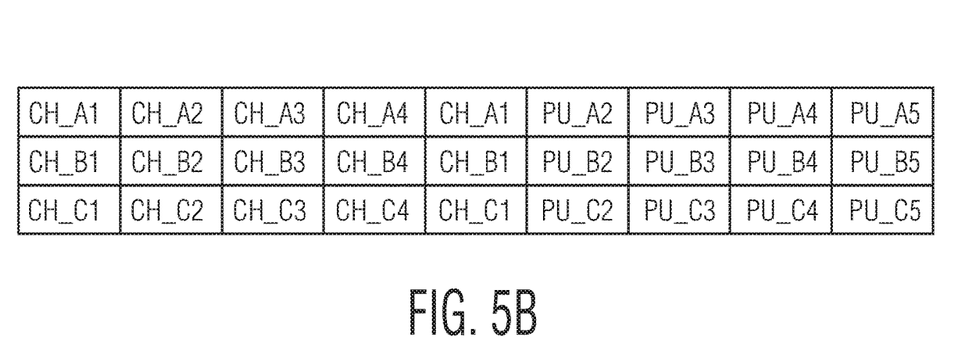

FIG. 5B illustrates an example of where bit values of a challenge word have been shifted into respective ones of the scan chains. For example, at the point in time corresponding to FIG. 5B, challenge (CH) bit values CH_A1, CH_A2, CH_A3, and CH_A4 have been shifted into the first scan chain, challenge bit values CH_B1, CH_B2, CH_B3, and CH_B4 have been shifted into the second scan chain, and challenge bit values CH_C1, CH_C2, CH_C3, and CH_C4 have been shifted into the third scan chain. Also, at this point in time, four power-up values have been shifted out of each of the scan chains.

The combinatorial logic 320 may generate output values based on the bit values stored in each flip-flop, as the bit values are shifted through the scan chain logic. For example, the combinatorial logic 320 may read the initial bit values (PU_A1 to PU_A9) stored in the scan chains (e.g., as shown in FIG. 5A) and then generate a corresponding output. The values output from the combinatorial logic may be buffered on a temporary basis before being input back into respective ones of the scan chains.

At 450, shifting operations continue to be performed for each of the scan chains in the scan chain logic. For each shift, the combinatorial logic reads the contents of the flip-flop and generates corresponding output values. For example, the combinatorial logic may read the flip-flops as each additional value (CHs and then REs) is shifted into the scan chains, on a bit-by-bit basis. Corresponding output values may then be generated. Thus, for the first scan chain $340_1$, the combinatorial logic may generate one or more outputs based on the combination of values (CH_A1, PU_A1, . . . , PU_A8), which represents the contents of the flip-flops in the first scan chain after CH_A1 is shifted into the scan chain which causes PU_A9 to be shifted out of the scan chain.

During this process, logical values (responses RE) processed by the combinatorial logic may be input, on a bit-by-bit basis, into respective scan chains of the scan chain logic until the scan chains in the scan chain logic include all of the responses generated by the combinatorial logic based on the shifted-in power-up and the bit values of the challenge word. The responses stored in the flip-flops of the scan chain(s) at the end of the capture mode correspond to a second, strong PUF of the integrated circuit that is tamper-resistant.

Figure 5C:
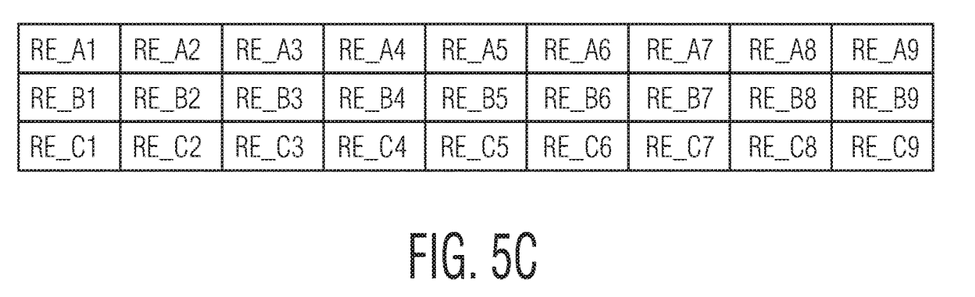

FIG. 5C illustrates an example of the responses stored in the scan chain logic during the capture mode of operation 450. The responses (RE) correspond to the bit values RE_A1, . . . RE_A9 for the first scan chain, bit values RE_B1, . . . , RE_B9 for the second scan chain, and RE_C1, . . . RC_C9 for this third scan chain. At the completion of the capture mode, the flip-flops in each scan chain store all of the responses generated as a result of the power-up values and the challenge word bit values being processed through the combinatorial logic.

At 460, the responses are shifted out of the integrated circuit chip to the production tester 350 and/or another type of external system or device (e.g., server) for storage and subsequent use in authenticating the integrated circuit device during normal operation, e.g., during the intended application of the product including the integrated circuit chip. Authentication may be performed in a variety of contexts and a variety of ways for purposes, as will now be discussed.

In some implementations, the second PUF generated based on a combination of the power-up values of the flip-flops may be considered to be performed during an enrollment operation. In other implementations, the second PUF may be generated as part of an authentication operation, where the second PUF would be compared with a PUF generated by a simulator. If the simulator results and the second PUF match, the product including the semiconductor device may be deemed authenticated. If no such match exists, then access to account or other information associated with the product may be denied, on grounds that a hacking attempt has been made.

The system embodiments described herein are also beneficial in that the challenge word may be changed each time the application is to be implemented or on some other predetermined or random basis. Also, while one challenge word has been described in the aforementioned embodiments, multiple challenge words may be input into the scan chain and combinatorial logic to generate third and additional physically unclonable functions, with each challenge word adding an additional measure of protection against hacking, whether that hacking involves gaining access to the semiconductor device or the information associated with that device. Examples of information that can be protected include medical records, financial information, account or subscriber information, and passwords, as well as any other information that is sought to be protected which is processed by or otherwise interacts with the semiconductor device.

Figure 6:
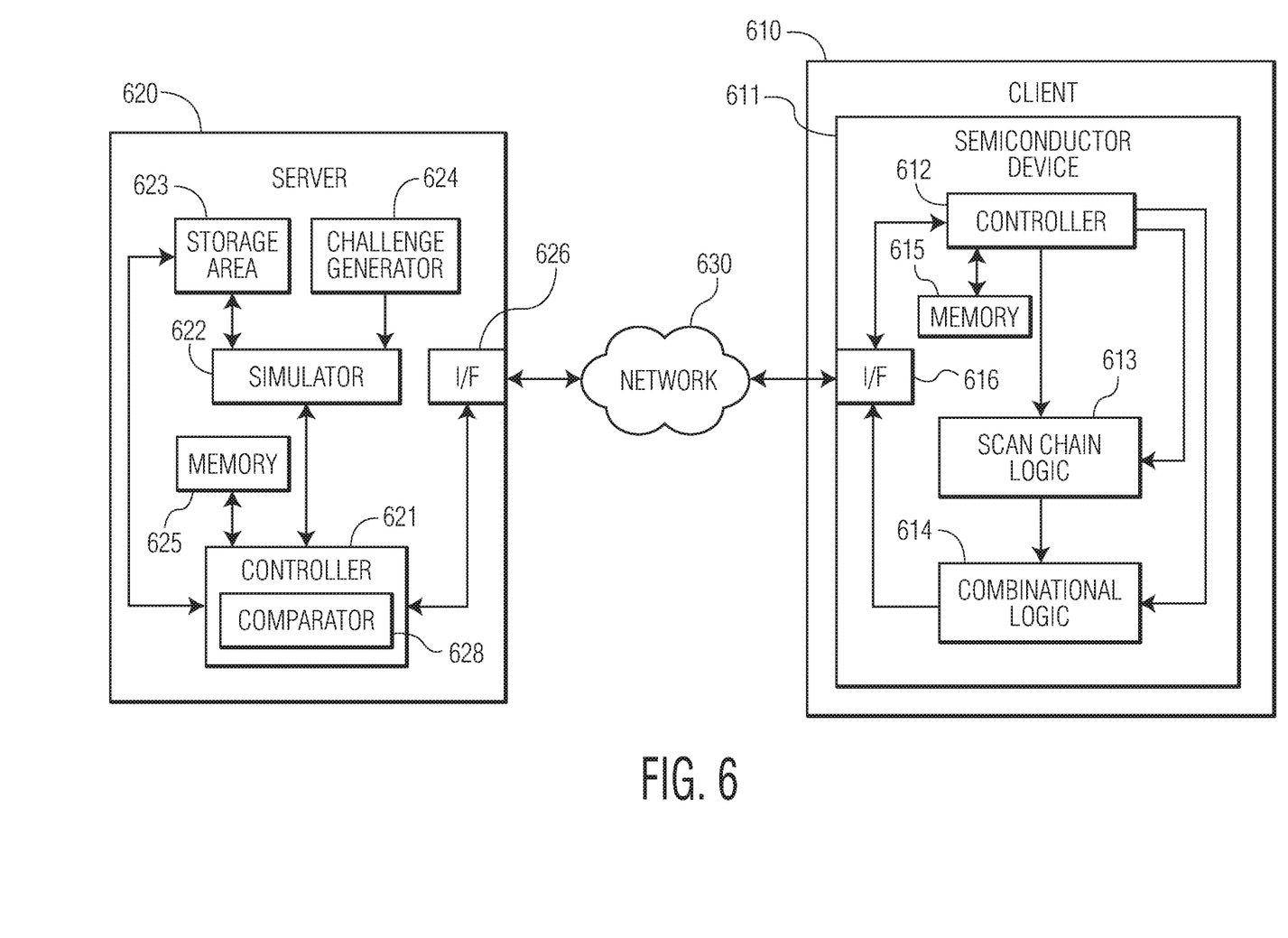
FIG. 6 illustrates another embodiment of a system for generating a security feature.

FIG. 6 illustrates an embodiment for controlling access to or otherwise enhancing the security of a semiconductor device. The embodiment may be practiced at any time, but may be especially beneficial after the device has been included in a product released for use in its intended application. The product may be various types of devices or systems. Examples include, but are not limited to, a smartcard used for performing financial transactions, a smartphone with a wallet application, a client or server with sensitive information that communicates with another system or server, or other types of devices or systems that store or have access to an asset for which access is sought by another device or system. Examples of the information include medical records, account information, financial information, passwords, or other types of information of value or interest.

The semiconductor device to be protected includes a system for generating at least a second physically unclonable function based on a first physically unclonable function. The system may implement any of the method embodiments described herein.

Referring to the example of FIG. 6, the semiconductor device is included in a client 610 and stores or otherwise has access to the asset of interest. For the sake of illustration, the asset will be discussed as medical records of a patient associated with the client device. Access to the asset is sought by a server 620, which may communicate with the client over a network 630 or through another type of wired or wireless communications link. The server 620 may be associated with a medical facility, medical insurer, or other interested party.

The client 610 may be a system or device with an integrated circuit chip (semiconductor device) 611 that includes a controller 612, scan chain logic 613, and combinatorial logic 614. These features may correspond, for example, to those described in previous embodiments, and in some implementations may perform the operations of the method embodiments described in association with this client, as discussed in greater detail below. For example, controller 612 may control operations (e.g., timing, enabling, shifting, etc.) performed by the scan chain logic and combinatorial logic. In one embodiment, the controller 612, may also operate as a clock signal generator for generating clock signals for the scan chain logic and/or combinatorial logic. The controller 612 may include a processor which executes instructions stored in a non-transitory computer-readable medium (e.g., memory 615) for performing the operations described herein. The client 610 may communicate with the network 630 over at least one interface 616, which, for example, may be in the integrated circuit 611 or another portion of the client and which may be compatible with the type of network. Examples of the network include, but are not limited to, the internet, a virtual private network, a mobile communications network, as well as others.

The server 620 includes a controller 621, a simulator 622, a storage area 623, a challenge generator 624. The controller 620 controls operations of the simulator and/or challenge generator, communicates information with the client 610 over the network, and/or performs other operations for implementing the method embodiments described herein. Like controller 612, controller 621 may include a processor that executes instructions stored in a non-transitory computer-readable medium (e.g., memory 625) for performing the operations described herein. While the controller is shown to be separate from the simulator and challenge generator, in one embodiment the operations performed by the simulator and challenge generator may be separate logic blocks within the controller. The storage area 623 may be a memory or other storage device within or coupled to the client. In one embodiment, the storage area 623 may be a database coupled to the client. The controller and/or other features of the client may communicate information with the network over at least one interface 626. The operations of the simulator and challenge generator will become more apparent with reference to the following method embodiments implemented by the client and server.

Figure 7:
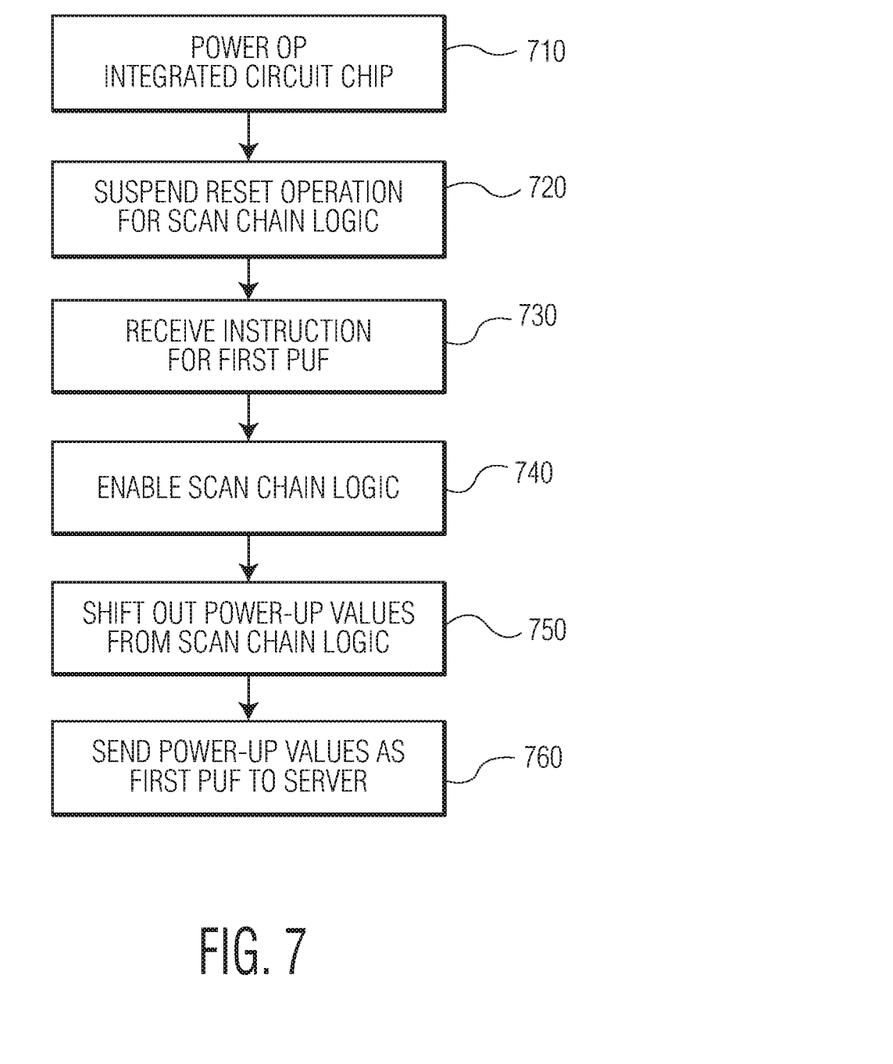
FIG. 7 illustrates another embodiment of a method for generating a security feature.
Figure 8:
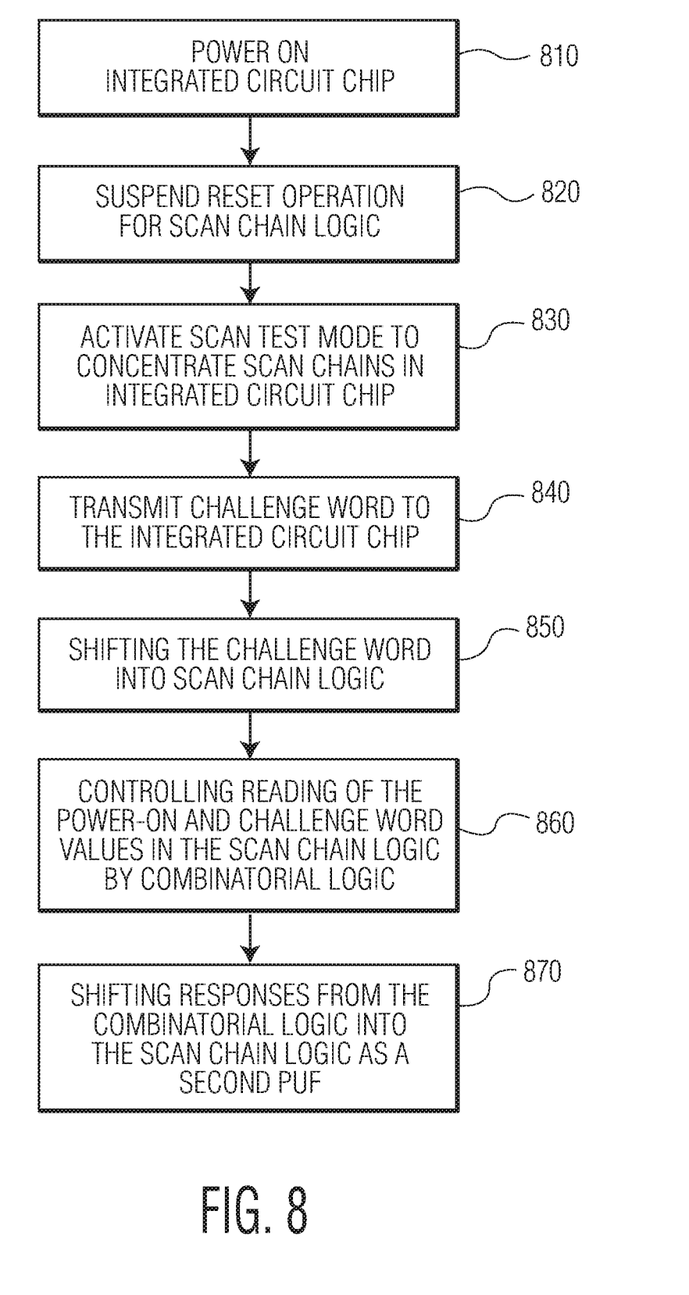
FIG. 8 illustrates another embodiment of a method for generating a security feature.

FIGS. 7 and 8 illustrate operations included in embodiments of a method for controlling access to or otherwise enhancing the security of a semiconductor device, using the system of FIG. 6. In another embodiment, the method may be implemented by a different system. Also, the operations performed in each of the client 610 and the server 620, and in each of the modes of operation, may themselves be considered method embodiments, as will become apparent in the following discussion.

The method for controlling access to the semiconductor device may be performed in at least two modes: Enrollment Mode and Authentication Mode. The Enrollment Mode is performed in order to store at least one PUF corresponding to the integrated circuit 611 in the client 610. One purpose of the Enrollment Mode is to transfer information indicative of the first PUF of the integrated circuit chip for storage in the server.

One purpose of the Authentication Mode is to authenticate, or verify, that the product (and more specifically, the semiconductor device in the product) has authorization to access to access an asset controlled or otherwise associated by the server. For example, attempts may be made to fraudulently reproduce a product or semiconductor device (either physically or in terms of its functionality) to gain unauthorized access to the asset. The Authentication Mode is performed to allow the server to establish the authenticity of the product/semiconductor device for purposes of granting access to the asset.

Referring to FIGS. 6 and 7, the method embodiment for performing the Enrollment Mode includes, at 710, powering on the integrated circuit device 611, for example, by turning on the client 610. When the integrated circuit is powered on, initial power-up values are loaded into the flip-flops of the scan chain logic 613 as a result of the manufacturing variations of the device. Because these initial values are loaded into the flip-flops at every power on, they may correspond to a first PUF of the device. It is this first PUF that is unique to the integrated circuit and thus used as one basis for generating second or subsequent PUFs used in the Authentication Mode.

At 720, the controller 612 suspends, or otherwise prevents, a reset operation from being performed for the flip-flops in the scan chain logic. By preventing the reset operation, the controller may cooperate with the server 620 to output the power-up (PU) values of the flip-flops in the scan chain logic indicative of the first PUF.

At 730, the controller 612 receives an instruction from the server 620 through the interface 616. The instruction may be sent in order to prompt the integrated circuit chip to send the first PUF corresponding to the power-up values of the scan chain logic of the integrated circuit chip. In one embodiment, the instruction may be an IEEE Standard 1149.1 (JTAG) boundary-scan testing (BST) instruction.

At 740, the controller 612 enters a scan test mode in response to the instruction. During this mode, predetermined flip-flops in the integrated circuit device are logically concatenated in a predetermined sequence in order to form one or more scan chains of the scan chain logic 613. These flip-flops may span across different portions of the integrated circuit, which, for example, having different functionality or may derive from a common portion of the circuit. The concatenation operation may be performed, for example, by control signals sent from the controller 612 to corresponding connection logic (e.g., switches, multiplexers, etc.) in the integrated circuit to achieve the concatenation.

At 750, the controller 612 sends control signals (e.g., enable signals, clock signals, etc.) to shift the power-up values out of the scan chain logic. For example, the power-up values are sequentially shifted through the flip-flops of the one or more scan chains of the scan chain logic at each rising or falling edge of a clock signal, until all of the power-up values are shifted out of the scan chain logic.

At 760, the controller 612 then sends the power-up values to the server through the network 630 and interface 615. The power-up values may be sent, for example, in packets with predetermined headers identifying the type and order of the power-up values. Once received, the controller of the server may store the power-up values at a location (e.g., database entry) that corresponds to the specific integrated circuit of the client. In one embodiment, the location may store an identifier that uniquely identifies the integrated circuit chip so that the values may be accessed during authentication. The power-up values may be stored in a sequence that corresponds to the one or more scan chains in the scan chain logic, so that authentication may be properly performed. The location may, for example, be the storage area of the server. Once stored, the server now has access to the first PUF of the integrated circuit.

In one embodiment, the client may receive another instruction from the server to direct the client controller to restrict access to the integrated circuit based on certain conditions. This additional instruction may be a JTAG instruction, which in one embodiment may be interpreted by the client controller to prevent the shifting out of data from the integrated circuit chip to any entity without successful completion of a scan capture mode performed during Authentication Mode.

FIG. 8 illustrates operations that may be included in an embodiment of a method for performing the Authentication Mode for the integrated circuit. The Authentication Mode may be performed, for example, after the Enrollment Mode has been performed or may be performed without prior enrollment. In the example under consideration, the Authentication Mode may be performed when the server receives a request to access the medical records of a patient. Before granting access to the records, the server may perform a process of authenticating the entity (e.g., client 610) which transmitted the request. This may be accomplished through the operations the method embodiment described below, performed during the Authentication Mode.

The method may begin by performing some of the same initial operations that were performed in the Enrollment Mode. For example, at 810, the integrated circuit chip 611 is powered up by turning on the client 610.

At 820, the controller 612 suspends a reset operation, or performs authentication operations before a reset operation is performed, for the flip-flops in the scan chain logic.

At 830, the server 620 sends an instruction to the client 610 through the network 630. The controller 612 of the client response to the instruction (e.g., JTAG instruction) by activating a scan test mode, which involves concatenating the flip-flops in the integrated circuit to form the scan chain logic. The scan chain logic may include one or more scan chains of flip-flops as previously described. At this point, the flip-flops in the scan chain(s) of the scan chain logic store the initial power-up values set based on variations in the physical and/or electrical characteristics of the IC. As previously indicated, these power-up (PU) values correspond to the first PUF of the IC. An example of the contents of the flip-flops in the scan chain logic at this time is set forth in FIG. 5A.

At 840, the server transmits at least one challenge word to the client through the network. The challenge generator 624 generates the challenge word, for example, on a random basis or the challenge word may be predetermined, for example, based on a cryptographic or other security algorithm selected for authentication. The controller 621 of the server may control transmission of the challenge word(s) output from the challenge generator to the client through the network. Each challenge word generated by the challenge generator 624 may have a predetermined number of bit values. The bit values of the challenge word(s) may be used, along with the PU values initially stored in the flip-flops, to generate responses for generating a second PUF for the integrated circuit. The second PUF of the integrated circuit may then be used for authentication. In one embodiment, the length of the challenge word may be shorter than the length of the scan chain, e.g., the number of flip-flops in the scan chain.

At 850, the controller 612 of the integrated circuit chip shifts bit values of the challenge word(s) into the one or more scan chains of the scan chain logic based on corresponding clock signals. Shifting the bit values of the challenge word(s) into the scan chain(s) may be performed on a bit-by-bit basis. In one embodiment, the same challenge word may be shifted through the flip-flops of each scan chain, when the scan chain logic includes a plurality of scan chains of flip-flops. In another embodiment, the server may output different challenge words, each to be input into a respective one of the scan chains of the scan chain logic. Shifting the challenge word bit values into each scan chain causes a power-up value at the end of the scan chain to be shifted out, e.g., the shifting the challenge word values into the scan chain logic causes a respective number of power-up bit values to be shifted out from the scan-chain flip-flops, and this shifting operation continues until all of the challenge bit values are shifted out from the scan chain logic.

At 860, the power-up and challenge word bit values are read by the combinatorial logic 614 as they are shifted, bit-by-bit, through the one or more scan chains of the scan chain logic of the integrated circuit chip. An example of the state of the flip-flops during the process of shifting the challenge word into the scan chain logic is shown in FIG. 5B. In FIG. 5B, bit values CH correspond to respective shifted-in bits of the challenge word(s) of respective ones of the scan chains and bit values PU correspond to the power-up bit values corresponding to the first PUF, as previously described.

At 870, the bit values output from the combinatorial logic are sequentially shifted into corresponding ones of the flip-flops of the scan chain logic. The bit values output from the combinatorial logic may be considered to be responses to the challenge word(s). An example of the state of the flip-flops filled with the responses generated by the combinatorial logic, based on the power-up values and challenge word values, is illustrated in FIG. 5C as previously discussed. The responses in the flip-flops correspond to a second PUF generated for the integrated circuit and are transmitted to the server 620 through the network to complete the authentication process.

Through these operations, the second PUF for the integrated circuit chip may be considered a strong PUF generated based on the first PUF. More specifically, the second, strong PUF is generated based on a combination of the power-up values corresponding to the first PUF and the challenge word(s). In this embodiment, a single scan capture mode is executed; that is, a single challenge word (or a single set of challenge words, one for each scan chain of the scan chain logic) is input. In another embodiment, multiple challenge words (or sets of challenge words) may be input.

Figure 9:
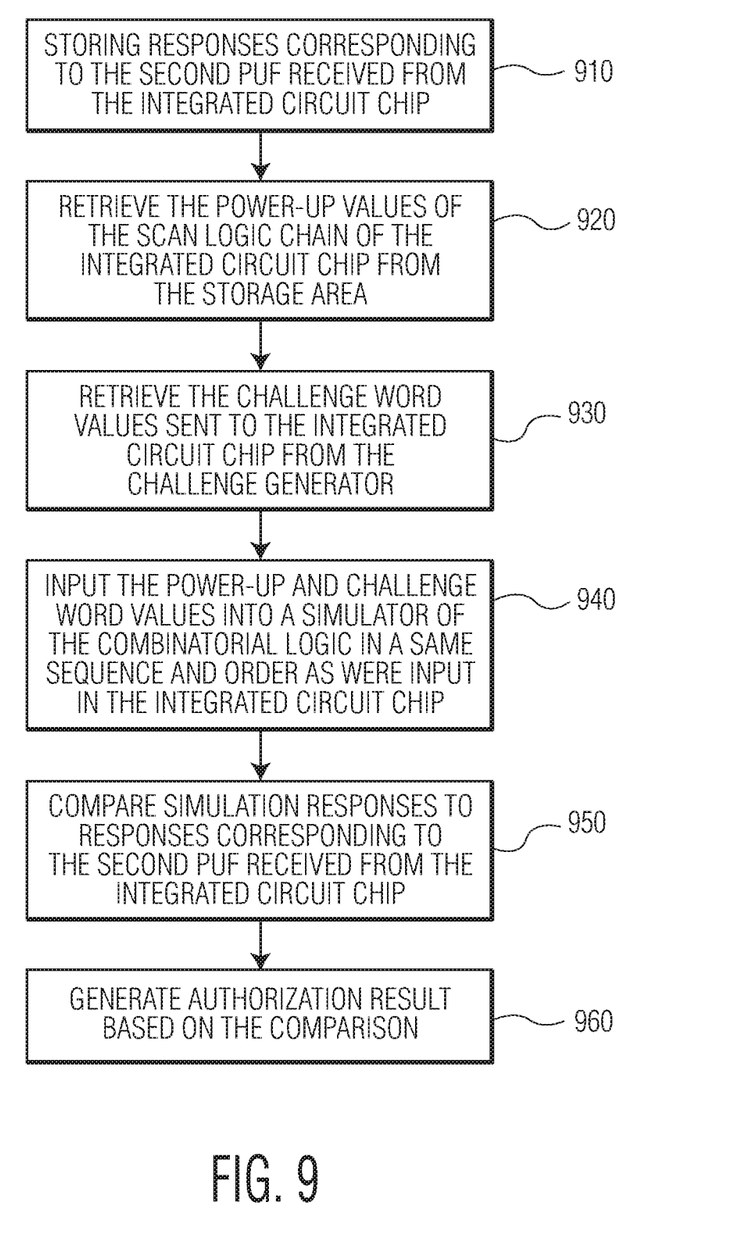
FIG. 9 illustrates another embodiment of a method for generating a security feature.

FIG. 9 illustrates an embodiment of a method which includes operations performed in the server based on the second PUF received from the client during Authentication Mode. At 910, the method includes storing the responses corresponding to the second PUF received from the integrated circuit chip of the server.

At 920, the power-up values of the integrated circuit chip 611 stored in the storage area 623 are retrieved and input into the simulator 622. These power-up values (e.g., the first PUF) may have been previously received from the client and stored in storage area 623 during the Enrollment Mode or may have been previously stored in this storage area as received from the manufacturer or in another manner.

At 930, the challenge word(s) sent to the client 610 to create the second PUF are received from the challenge generator 613 and input into the simulator 622. The simulator includes the same logic (e.g., a software representation of the logic) corresponding to the combinatorial logic in the integrated circuit chip of the client.

At 940, the simulator 622 inputs the power-up values and the bit values of the challenge word(s) into the logic simulating the combinatorial logic of the integrated circuit chip, in the same sequence and order as these values were input into the combinatorial logic in the integrated circuit chip to generate the second PUF, for example, according to the method of FIG. 8.

At 950, the responses generated from the simulation are then compared to the responses corresponding to the second PUF received from the client. A determination is then made as to whether these responses match. The comparison may be performed by the simulator 622 or a comparator 628 within the controller 621 of the server (FIG. 6). If there is a match, the client (or more accurately the integrated circuit chip in the client) is authenticated as a valid entity for communicating with and/or accessing the asset through the server. If there is no match, a determination may be made that client may not be a trustworthy client and may be trying to fraudulently access the asset. In this case, access may be denied or additional the server may request additional information from the client in order to make a final determination of whether the client is trying to hack the asset.

Thus, in accordance with one or more embodiments, the challenge responses generated from the integrated circuit chip are based on a combination of the power-up values of the scan flip-flops (e.g., which may be considered as a unique IC secret), a configuration of the combinatorial logic, and the one or more challenge words. In some cases, it is possible for a plurality of ICs to have the same combinatorial logic to be used for generating the challenge responses. In this case, the combinatorial logic configuration may be kept secret and may only be known to the server. In another case, the combinatorial logic to be used for generating the challenge responses (e.g., for generating the second PUF) may different from IC to IC.

The second strong PUF generated in accordance with one or more embodiments may provide an improved level of security because such a PUF cannot be attacked using known machine-learning-based techniques. This is because the combinatorial logic, challenge word(s), and power-up values are not known to the attacker. Even if the power-up values were somehow able to be determined, that knowledge alone would not allow the attacker to gain access to the integrated circuit chip for lack of knowledge of the combinatorial logic and challenge word(s).

Additionally, the structure of the combinatorial logic is not subject to being reverse-engineered by applying a large number of scan patterns and evaluating the responses after a scan capture mode. This is because such an approach (known as NP-hard) would require a "near to infinite" number of scan patterns, which is not possible. The embodiments described herein may be used in a stand-alone manner or combined with other security methods.

In one embodiment, an operation may be performed which involves calculating responses from the combinatorial logic based on varying a predetermined number of power-up values. Since each of the power-up values may be either a logical one or a logical zero, some of the power-up values may be varied (e.g., toggled) in order to take into account errors or unstable PUF values that may have occurred. The predetermined number of power-up values that may be varied one or more, but fewer than all, of the power-up bit values.

A number of additional operations may be performed in order to compensate for unstable power-up values. Because the power-up values may be unstable at times (e.g., different during authentication compared to enrollment), an authentication mechanism must be implemented that is robust against such instabilities. In accordance with one embodiment, the binary value in one or more flip-flops in the scan chain logic may be replaced with its opposing binary value in order to take into account possible variations. This operation may ensure that correct challenge responses are determined when the correct netlist is known to the server.

In one embodiment, the number of authentication requests may not be limited. For example, only the power-up values of the scan flip-flops may be stored on the server. The expected responses may be calculated based on these values and the challenge word(s). Through this approach, an unlimited number of authentications are possible. Moreover, in case of a large number of intended authentications (e.g., one million or more), this approach may be effective in saving storage space at the server.

Table 1 provides examples of attack scenarios and how the attacks may be countered with improved levels of security in accordance with one or more embodiments described herein.

TABLE 1

| Type of Attack | Explanation | Defense |
| --- | --- | --- |
| Side channel reading of raw PUF values | read out the power-up flip-flop contents | Power-up values may be used if the combinatorial logic is known. Read-out of scan chains before normal mode may be blocked after production test |
| Modelling of challenge-response behavior | Exploiting the correlation among different challenge-response pairs to model the challenge-to-response function, and then be able to predict the response to a given challenge | Power-up values are hidden/encoded by the unknown combinatorial logic |
| Cloning | Changing the power-up state of the flip-flops by layout manipulation (e.g., Focused Ion Beam (FIB) Circuit Edit) | The layout manipulation would change the timing of the flip-flops, so that very likely the circuit would not be functional anymore. |

In accordance with one embodiment, the length of the challenge word may be varied during different authentication modes performed for the same IC or from IC-to-IC. Varying the length of the challenge word may allow a much larger number of challenge-response pairs to be generated and used for authentication, compared to the case where all challenge words have a fixed length. This approach may also minimize the risk of two ICs having the same challenge-response-pair and may also make modelling attacks even more difficult.

Additionally, varying the length of the challenge word for different authentications performed for the integrated circuit chip may provide enable a greater level of fine-tuning to be performed. For example, a longer challenge word may mean that, right before the scan capture mode cycle, fewer flip-flops are realized that have power-up values shifted from scan flip-flops at the beginning of the scan chain. This may reduce the likelihood of unstable flip-flops.

In accordance with one embodiment, instead of using power-up values of scan flip-flops as raw PUF data, the behavior of flip-flops that receive a (re)set pulse concurrent with a clock pulse during scan capture mode may be determined. This may lead to unpredictable output values that differ from one IC to another, but this may be assumed to not change over time and hence may be considered to be characteristic for each individual IC.

In accordance with one embodiment, the number of scan normal mode cycles may be varied. For example, a variable number of successive capture mode cycles (e.g., multiple clock pulses) may be applied to the scan flip-flops before entering a scan shift mode. This number may be determined, for example, by the server and may be used as a basis for fine-tuning properties of a PUF (e.g., a large number of cycles may translate into a large number of challenge-response pairs, but also may increase the number of unstable flip-flops that are taken into account). When using more than one capture mode cycle, the challenge word and power-up bit values may be sent through the combinatorial logic several times, in order to generate third and/or subsequent strong PUFs with the last generated PUF being used for authentication during the simulation performed in the server.

In accordance with another embodiment, the challenge word(s) may be selected based on flip-flops in the scan chain logic that are known to be unstable. For example, in a number of IC types, there may be some specific flip-flops that are unstable, e.g., may exhibit a pattern of having differing power-up values in enrollment and authentication modes. In this embodiment, a large number of possible challenge words may be selected so that those scan flip flops that have been identified as being less stable in most ICs (e.g., due to systematic issues) are treated as don't care bits for the respective capture mode, e.g., are ones that may belong to scan flip-flop bits that do not influence the result of the capture mode cycle.

In accordance with one embodiment, a majority voting operation may be performed in order to compensate for unstable power-up values. For example, majority voting hardware may be used to overcome problems caused by a relatively small percentage of unstable flip-flop power-up values.

The controllers, generators, simulators, comparators, testers, and other information-generating and information-processing features of the embodiments disclosed herein may be implemented in logic which, for example, may include hardware, software, or both. When implemented at least partially in hardware, the controllers, generators, simulators, comparators, testers, and other information-generating and information-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, generators, simulators, comparators, testers, and other information-generating and information-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. The embodiments may be combined to form additional embodiments. Accordingly, the foregoing disclosure, description, and figures are for illustrative purposes only and do not in any way limit the invention recited in the claims.

We claim:

1. A data processing method, comprising:
shifting power-up values of flip-flops through scan chain logic of a chip;
controlling reading of the power-up values by combinatorial logic in the chip as the power-up values are shifted through the scan chain logic; and
obtaining responses from the combinatorial logic based on the power-up values,
wherein the power-up values correspond to a first physically unclonable function of the chip and the responses correspond to a second physically unclonable function of the chip generated based on the power-up values corresponding to the first physically unclonable function.

2. The data processing method of claim 1, further comprising:
enabling the scan chain logic in accordance with operations that include concatenating the flip-flops into one or more scan chains.

3. The data processing method of claim 1, wherein the power-up values of the flip-flops are generated based on physical and/or electrical characteristics of the chip produced from a manufacturing process.

4. The data processing method of claim 1, further comprising:
shifting the responses corresponding to the second physical unclonable function into the flip-flops of the scan chain logic.

5. A data processing method, comprising:
shifting a challenge word through flip-flops of scan chain logic in a chip;
controlling reading of power-up values by combinatorial logic as the power-up values are shifted through the flip-flops of the scan chain logic, the power-up values shifted through the scan chain logic as the challenge word is shifted into the scan chain logic; and
obtaining responses output from the combinatorial logic based on the power-up values and the challenge word, wherein the power-up values correspond to a first physically unclonable function of the chip and the responses correspond to a second physically unclonable function of the chip generated based on the challenge word and the power-up values corresponding to the first physically unclonable function.

6. The data processing method of claim 5, wherein the power-up values of the flip-flops are generated based on physical and/or electrical characteristics of the chip produced from a manufacturing process.

7. The data processing method of claim 5, further comprising:
generating one or more signals to concatenate the flip-flops into one or more scan chains of the scan chain logic.

8. The data processing method of claim 7, wherein the flip-flops are located in different logical blocks of the chip.

9. The data processing method of claim 5, wherein the responses corresponding to one or more logical operations performed by the combinatorial logic based on the power-up values and values of the challenge word.

10. A data processing method, comprising:
obtaining first values of a first physically unclonable function of a chip;
obtaining second values that correspond to at least one challenge word;
performing a simulation based on the first values and the second values; and
generating an authentication result for the chip based on results of the simulation,
wherein the simulation generates responses to logical operations corresponding to combinatorial logic in the chip, the logical operations performed based on the first values and the second values, and wherein generating the authentication result includes authenticating the chip based on a match between the responses generated by the simulation and a second physically unclonable function of the chip.

11. The data processing method of claim 10, wherein the first values correspond to power-up values of flip-flops in scan chain logic in the chip.

12. The data processing method of claim 11, wherein the power-up values of the flip-flops are generated based on physical and/or electrical characteristics of the chip produced from a manufacturing process.

13. The data processing method of claim 12, wherein the flip-flops are concatenated into one or more scan chains of the scan chain logic during at least one mode of operation of the chip.

14. The data processing method of claim 11, wherein:
the second physically unclonable function is received from the chip, and
the simulation is performed in a device in communication with the chip.

15. The data processing method of claim 11, wherein the second physically unclonable function includes values generated based on actual responses generated by the combinatorial logic on the chip and wherein the actual responses are generated by the combinatorial logic based on the first values and the second values.

16. The data processing method of claim 15, wherein the actual responses are generated based on the combinatorial logic performing one or more logical operations on the first values and then performing the one or more logical operations on the second values.

17. The data processing method of claim 10, wherein:
the simulation is performed by a server, and
the chip is included in a client of the server.

18. The data processing method of claim 10, further comprising:
receiving a request for a transaction or information; and
authorizing the request based on the authentication result.

19. The data processing method of claim 10, wherein the second physically unclonable function includes values generated by the combinatorial logic performing one or more logical operations on the first values.

* * * * *